US008996583B2

(12) United States Patent
Chen et al.

(10) Patent No.: US 8,996,583 B2
(45) Date of Patent: Mar. 31, 2015

(54) INTERACTIVE VISUAL DATA MINING FOR INCREASING CLASSIFICATION ACCURACY

(71) Applicant: EMC Corporation, Hopkinton, MA (US)

(72) Inventors: Tao Chen, Beijing (CN); Jidong Chen, Beijing (CN)

(73) Assignee: EMC Corporation, Hopkinton, MA (US)

( * ) Notice: Subject to any disclaimer, the term of this patent is extended or adjusted under 35 U.S.C. 154(b) by 251 days.

(21) Appl. No.: 13/629,967

(22) Filed: Sep. 28, 2012

(65) Prior Publication Data
US 2014/0095548 A1   Apr. 3, 2014

(30) Foreign Application Priority Data

Sep. 28, 2012  (CN) .......................... 2012 1 0366772

(51) Int. Cl.
G06F 17/30 (2006.01)
(52) U.S. Cl.
USPC .......................................................... 707/797
(58) Field of Classification Search
CPC ................................................. G06F 17/30286
See application file for complete search history.

(56) References Cited

U.S. PATENT DOCUMENTS

| 6,278,464 B1* | 8/2001 | Kohavi et al. ................. 345/440 |
| 8,290,882 B2* | 10/2012 | Sharp .............................. 706/10 |
| 2012/0321175 A1* | 12/2012 | Hedau et al. ................... 382/159 |
| 2013/0129230 A1* | 5/2013 | Shotton et al. ................ 382/218 |
| 2013/0346346 A1* | 12/2013 | Criminisi et al. ............... 706/12 |

OTHER PUBLICATIONS

Leo Breiman, "Random Forests," Machine Learning, Oct. 2001, pp. 5-32, vol. 45, No. 1.
"Random Forest," http://en.wikipedia.org/wiki/Random_forest, Aug. 2012, 5 pages.

* cited by examiner

Primary Examiner — Belix M Ortiz Ditren
(74) Attorney, Agent, or Firm — Ryan, Mason & Lewis, LLP

(57) ABSTRACT

Visual data mining techniques for increasing data classification accuracy are disclosed. For example, a method comprises the following steps. At least two decision tree data structures from a high-dimensional data set are generated. A composite data structure comprising the at least two decision tree data structures is generated. The composite data structure is generated based on a correlation computed between the at least two decision tree data structures. The composite data structure is visualized on a display. Modification of the composite data structure is enabled via interaction with the visualization of the composite data structure on the display.

20 Claims, 5 Drawing Sheets

US 8,996,583 B2

INTERACTIVE VISUAL DATA MINING FOR INCREASING CLASSIFICATION ACCURACY

FIELD

The field relates to data classification, and more particularly to visual data mining techniques for increasing data classification accuracy.

BACKGROUND

Data classification is important in the process of extracting information and knowledge from data sets (i.e., data mining), especially data sets that are high dimensional and sparse in nature. Such high-dimensional data sets have recently been referred to as "big data." As is known, the size of a data set characterized as big data is so large as to be beyond the ability of commonly used software tools to manage/process the data at all, or at least within a suitable time frame. For instance, the high dimensionality associated with big data typically results in poor performance of existing data classifiers used to classify new data records.

Typically, a data classifier is learned from the steps of: data preprocessing; model training; and model evaluation. For better accuracy, after the model evaluation step, the data preprocessing and model training steps can be reviewed, parameters tuned, and then the entire classifier learning process can be re-run. However, this process is not well suited for big data analytics. One iteration of the process itself can be cost prohibitive, let alone multiple iterations. As such, there is a need for techniques to improve the performance of data classifiers used to classify high-dimensional data sets including, but not limited to, data sets characterized as big data.

SUMMARY

Embodiments of the present invention provide visual data mining techniques for increasing data classification accuracy.

In one embodiment, a method comprises the following steps. At least two decision tree data structures from a high-dimensional data set are generated. A composite data structure comprising the at least two decision tree data structures is generated. The composite data structure is generated based on a correlation computed between the at least two decision tree data structures. The composite data structure is visualized on a display. Modification of the composite data structure is enabled via interaction with the visualization of the composite data structure on the display. The method may also comprise computing a classification accuracy (e.g., strength) for each decision tree data structure in the composite data structure.

In one example, the composite data structure is a random forest data structure. Enabling modification of the composite data structure via interaction with the visualization of the composite data structure on the display may further comprise enabling at least one of: removal of at least one decision tree data structure from the composite data structure; and addition of at least another decision tree data structure to the composite data structure. The method may further comprise classifying a new data record using the composite data structure.

In another embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

Advantageously, illustrative embodiments described herein provide for the visualization of a composite data structure such as a random forest ensemble for a high-dimensional data set (such as a data set that may be characterized as big data) so that a user can interact with the random forest visualization in order to efficiently improve classification accuracy.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

The phrase "data structure" refers to a mechanism and/or methodology for storing, organizing and/or processing data in a computing device so that the data can be more efficiently accessed and/or analyzed. For example, in the illustrative embodiments described herein, data structures such as a "decision tree" and a "random forest" are employed. A decision tree is a decision support type of data structure that employs a tree-like graph or model of decisions and their possible consequences. A random forest is an ensemble classifier type of data structure that contains multiple decision trees and typically outputs, for example, the class that is the mode of the classes output by individual decision trees of the random forest. An algorithm for inducing a random forest is disclosed by Leo Breiman in "Random Forests," Machine Learning 45 (1): 5-32, 2001. While illustrative embodiments of the invention employ decision trees and random forest, it is to be appreciated that principles described herein can be adapted to data structures, mechanisms, methodologies and data processing environments other than those mentioned herein.

Figure 3:
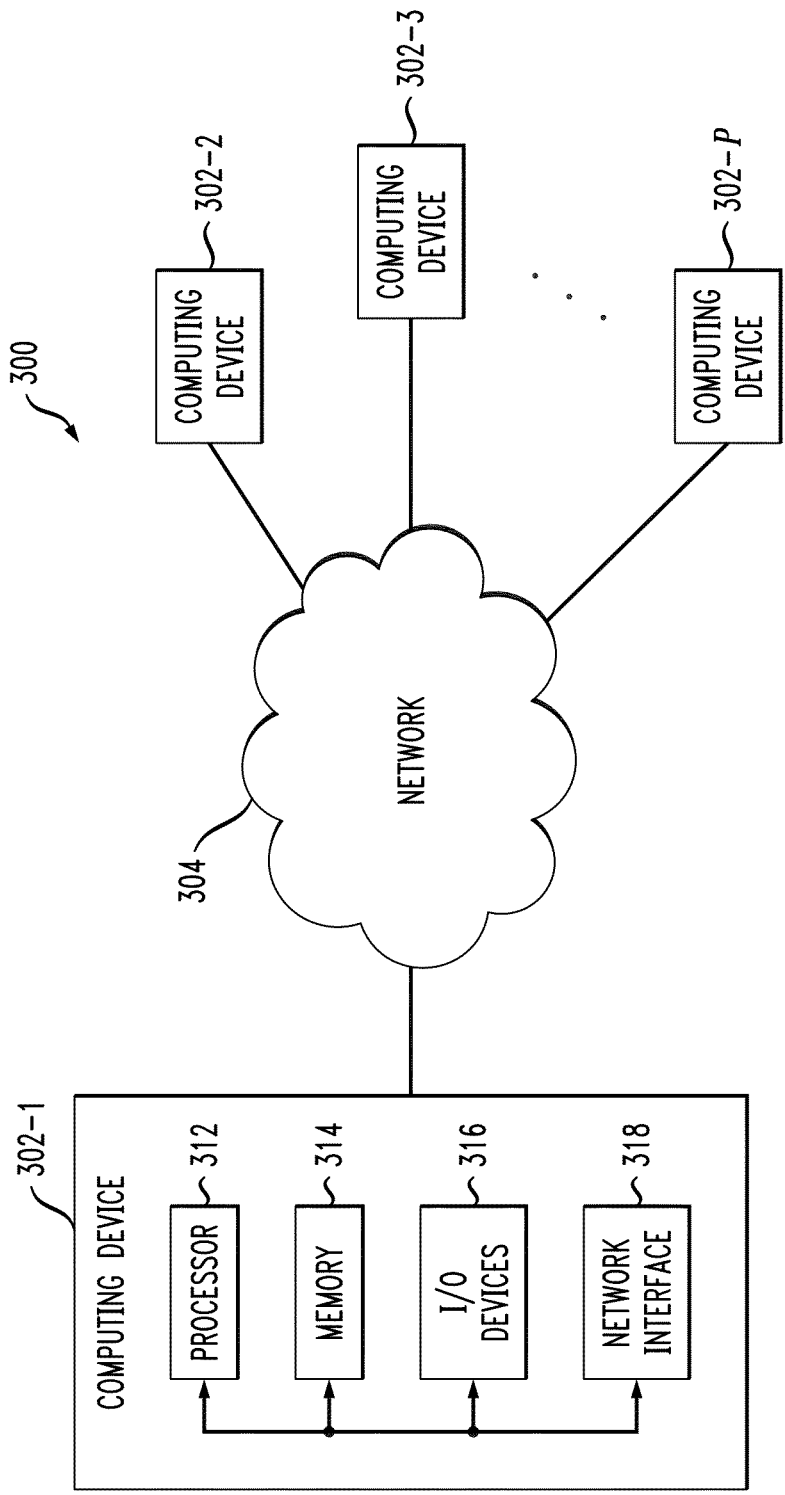
FIG. 3 shows a processing platform on which the cloud infrastructure and the interactive visual data mining module of FIG. 2A are implemented, in accordance with one embodiment of the invention.
Figure 4:
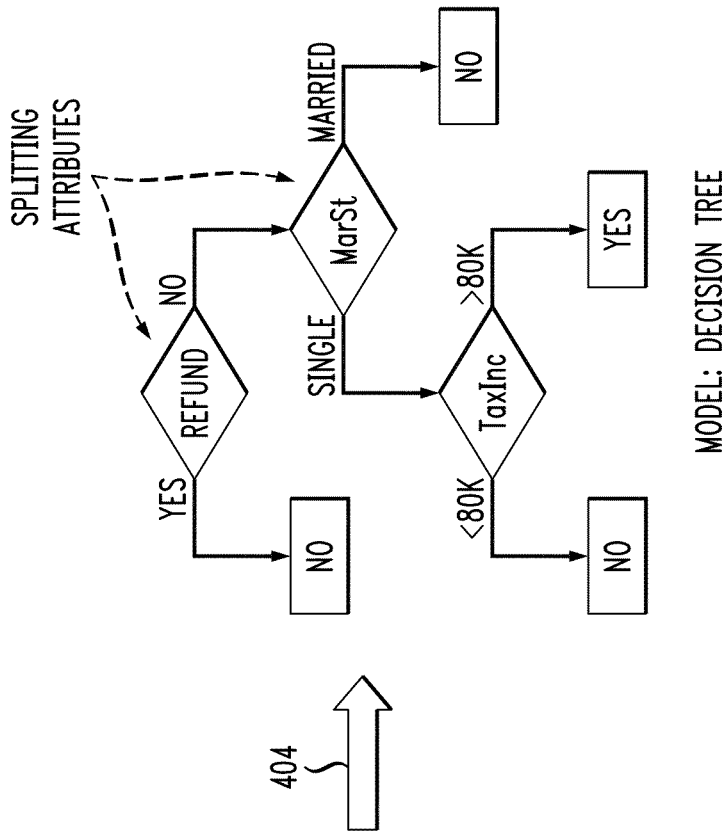
FIG. 4 shows a process for generating a decision tree model from a training data set, in accordance with one embodiment of the invention.
Figure 6:
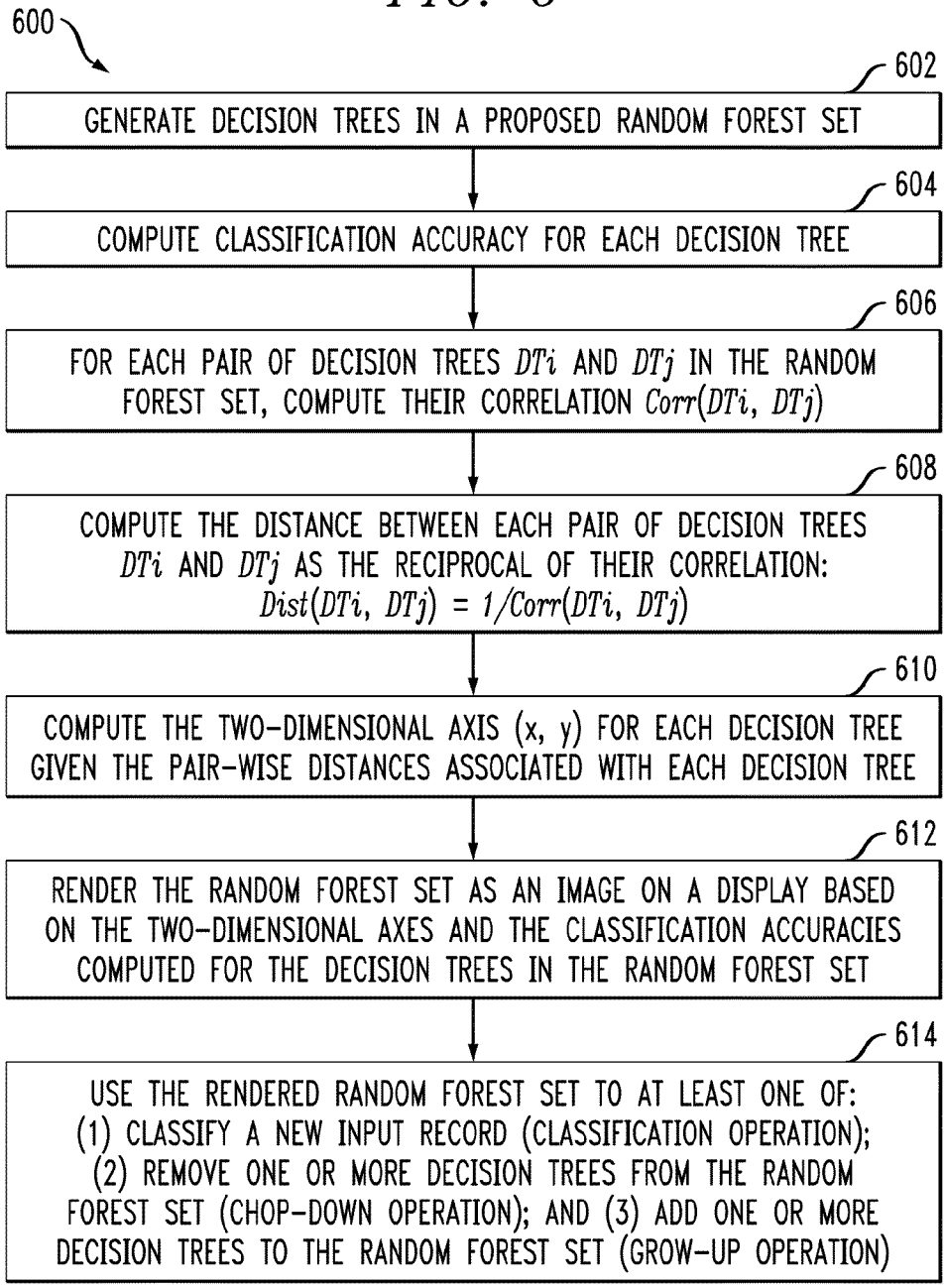
FIG. 6 shows a methodology for generating and interacting with a random forest visualization, in accordance with one embodiment of the invention.
Figure 5:
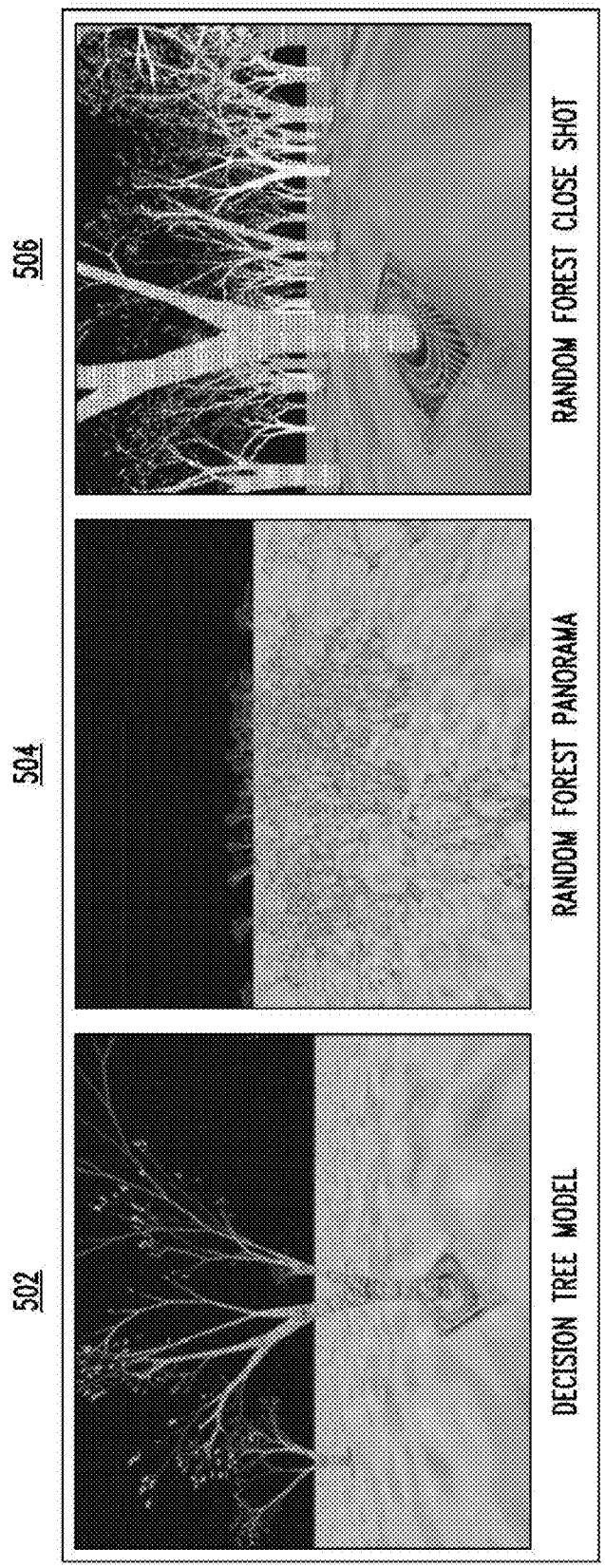
FIG. 5 shows visualizations of a decision tree and a random forest, in accordance with one embodiment of the invention.
Figure 5:
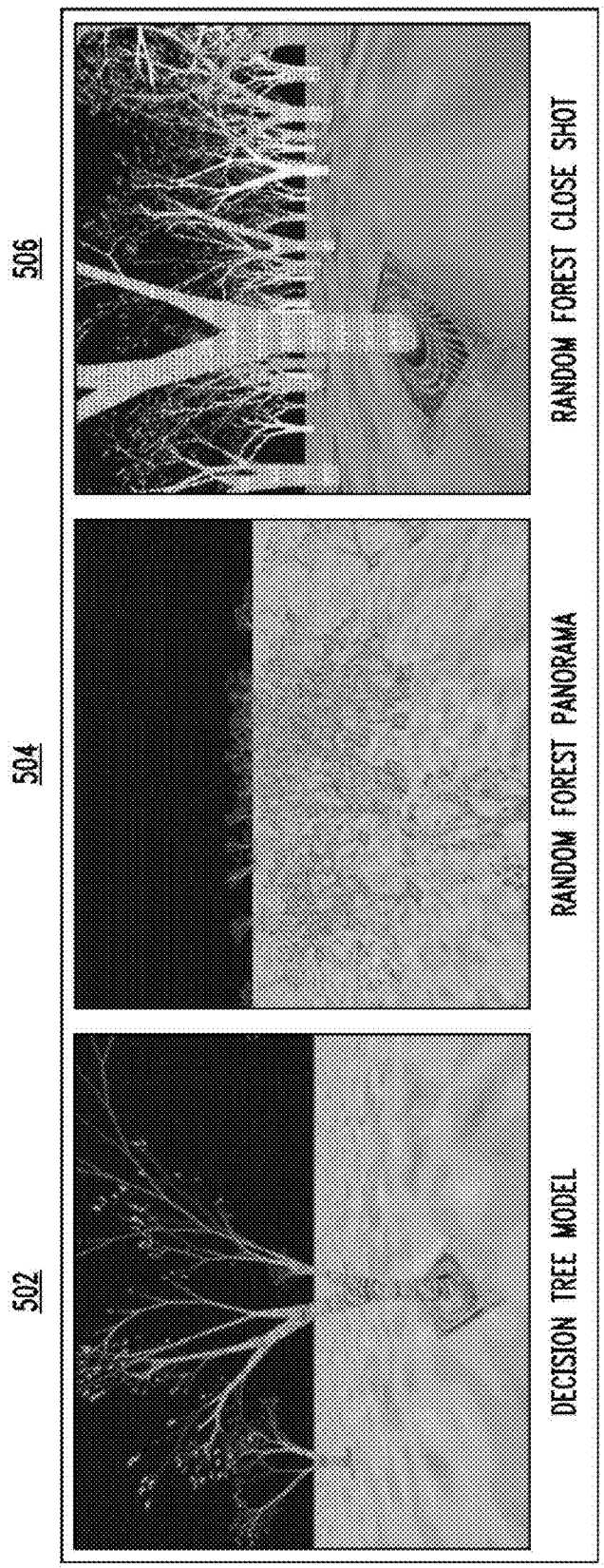

Prior to describing illustrative embodiments for generating interactive visualizations of random forest data structures and decision tree data structures in the context of FIGS. 4-6, illustrative embodiments of computing environments in which such techniques are implemented will be described in detail in the context of FIGS. 1-3.

Figure 1:
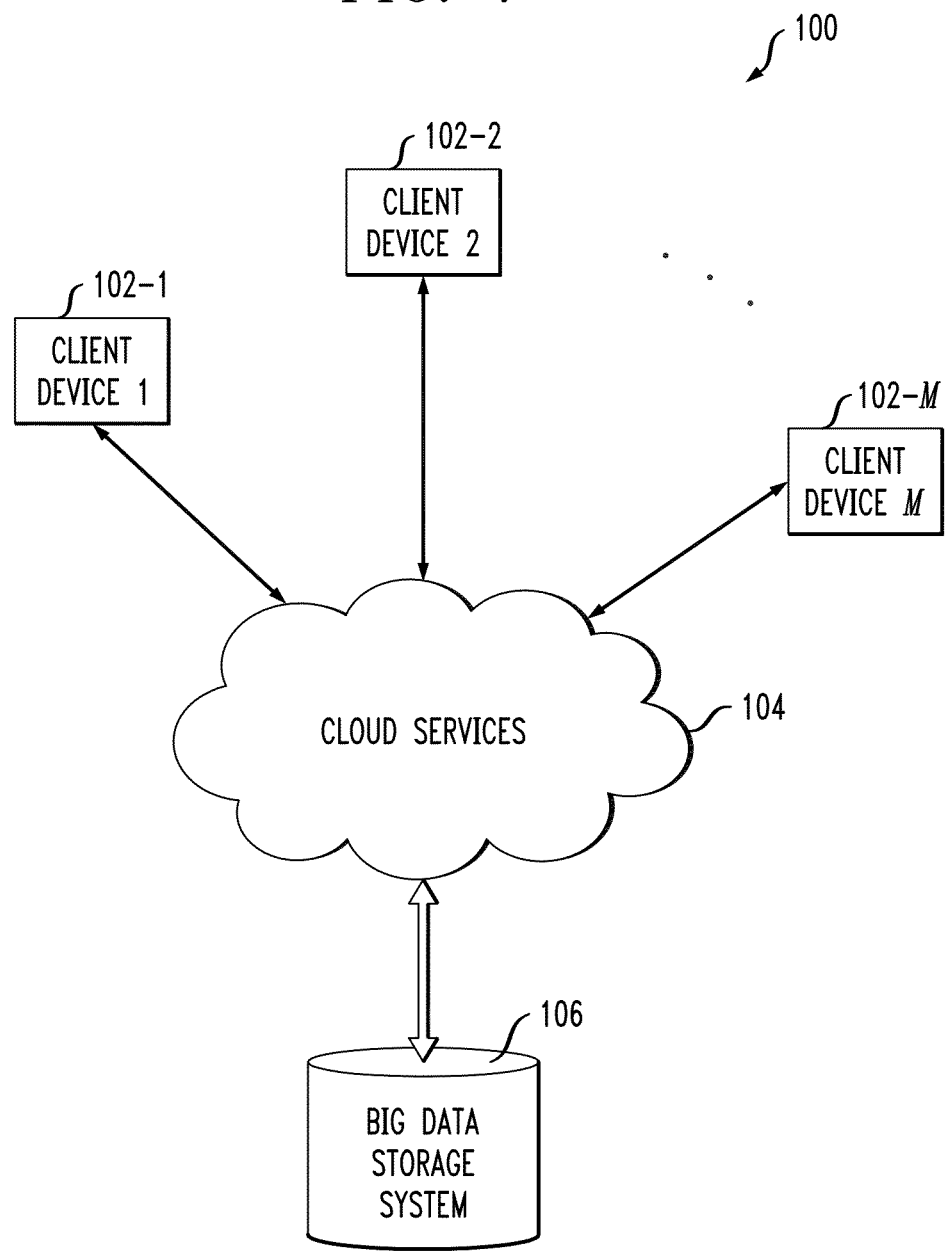
FIG. 1 shows a cloud-based data storage system environment, in accordance with one embodiment of the invention.

FIG. 1 shows a cloud-based data storage system environment 100, in accordance with one embodiment of the invention. As shown, client devices 102-1, 102-2, ..., 102-M are coupled to a communication network (e.g., Internet, intranet, wireless network, wired network, combinations thereof) 104 via which the client devices are able to access cloud services from one or more service providers. In one example of such cloud services, big data storage services are provided by data storage system 106 to one or more of the client devices 102-1, 102-2, ..., 102-M via communication network 104.

As mentioned above, "big data" typically refers to high-dimensional data sets whose size is so large as to be beyond the ability of commonly used software tools to manage/process the data at all, or at least within a suitable time frame. By way of example only, a system architecture that handles such "big data" may include the architecture referred to as the EMC Greenplum™ HD Data Computing Appliance (EMC Corporation, Hopkinton, Mass.) which adapts Apache Hadoop™ (Apache Software Foundation) open-source software to provide "big data" analytics and services. System 106 in FIG. 1 represents such a big data system architecture. Thus, client device 102-1, 102-2, ..., 102-M are configured to access data storage system 106 using one or more big data storage services. Data storage environment 100 is cloud-based, an explanation of which will be given below in the context of FIGS. 2A and 2B.

Thus, in accordance with embodiments of the invention, client device 102-1, 102-2, ..., 102-M are able to perform data mining and data classification operations on high-dimensional data stored on data storage system 106. To this end, environment 100 supports implementation of random forest visualization techniques according to embodiments described herein. That is, a user of one of the client devices is able to interactively visualize, on a display of the client device, a random forest data structure (which comprises multiple decision tree data structures) generated from data stored on data storage system 106. Generation of such a random forest and interaction therewith will be described below in further detail.

Figure 2A:
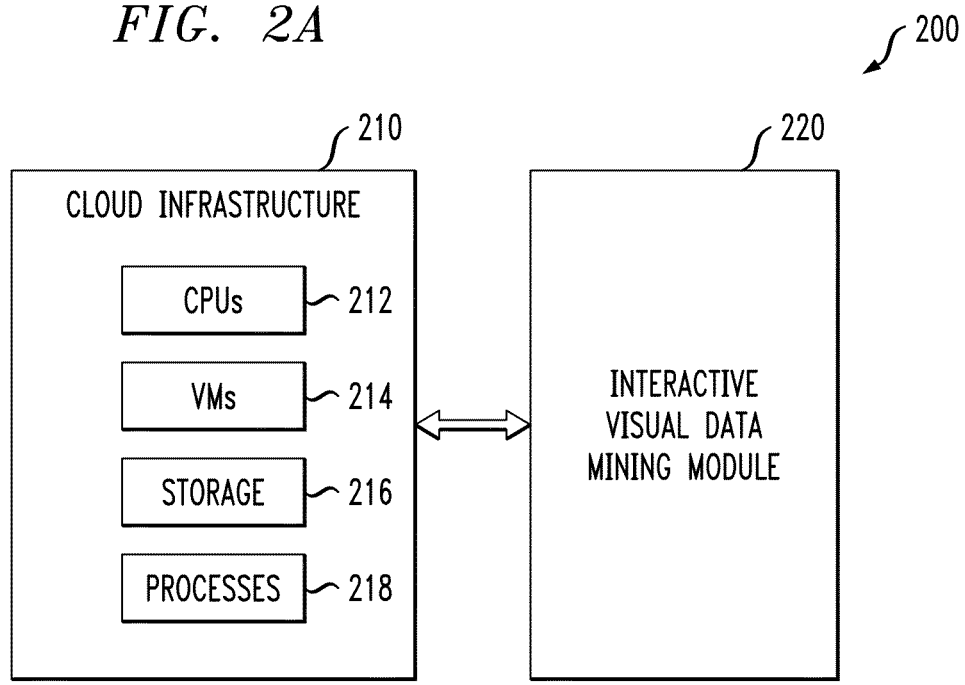
FIG. 2A shows cloud infrastructure and an interactive visual data mining module, in accordance with one embodiment of the invention.

FIG. 2A shows a system 200 configured in accordance with an illustrative embodiment of the present invention. As shown, the system 200 comprises cloud infrastructure 210 and an interactive visual data mining module 220. As will be explained in detail below, the interactive visual data mining module 220 enables a user to visualize a random forest data structure representing a high-dimensional data set such that the user can interact with the random forest data structure (e.g., remove/add decision trees from/to the random forest data structure to improve classification accuracy). Cloud infrastructure 210 is illustratively depicted in the figure as comprising an execution environment with execution components comprising one or more central processing units (CPUs) 212, one or more virtual machines (VMs) 214, and storage devices 216 (upon which logical units (LUs) are implemented) that execute one or more processes 218 that operate on one or more process input data sets that generate one or more process output data sets. It is to be appreciated that high-dimensional data sets (big data) that the interactive visual data mining module 220 will process are implemented in the cloud infrastructure 210 (thus, it may also be referred to as a cloud services infrastructure 210).

It is to be appreciated that part of or all of system 200 can be implemented in the cloud-based data storage system environment 100 in FIG. 1. For instance, the interactive visual data mining module 220 can be implemented in part or in whole in at least one of the client devices 102-1, 102-2, ..., 102-M of FIG. 1. Likewise, the interactive visual data mining module 220 can be implemented in part or in whole in data storage system 106 of FIG. 1. Still further, the interactive visual data mining module 220 can be implemented in part or in whole in one or more other computing devices or systems (not shown) in the cloud services network 104 of FIG. 1.

Although system elements 210 and 220 are shown as separate elements in FIG. 2A, these elements or portions thereof may be implemented at least in part on a common processing platform. In other embodiments, one or more of the system elements 210 and 220 may each be implemented on a separate processing platform, such as the processing platform to be described below in conjunction with FIG. 3. For example, the cloud infrastructure 210 may be implemented on a first processing device of a first processing platform and the interactive visual data mining module 220 may be implemented on a second processing device of a second processing platform. It is also to be understood that a given embodiment of the system 200 may include multiple instances of the system elements 210 and 220, although only single instances of such elements are shown in the system diagram for clarity and simplicity of illustration.

Figure 2B:
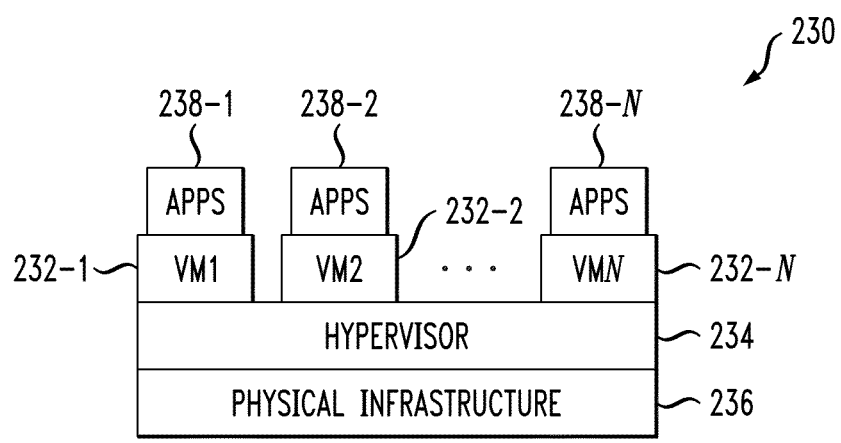
FIG. 2B shows a more detailed view of the cloud infrastructure of FIG. 2A.

As shown in FIG. 2B, the cloud infrastructure 230 (corresponding to 210 in FIG. 2A) comprises virtual machines (VMs) 232-1, 232-2, ..., 232-N implemented using a hypervisor 234. The hypervisor 234 is an example of what is more generally referred to herein as "virtualization infrastructure." The hypervisor 234 runs on physical infrastructure 236 (e.g., such as may include CPUs 212 and/or storage devices 216 in FIG. 2A). The cloud infrastructure 230 further comprises sets of applications 238-1, 238-2, ..., 238-N running on respective ones of the virtual machines 232-1, 232-2, ..., 232-N (utilizing associated LUs) under the control of the hypervisor 234.

Although only a single hypervisor 234 is shown in the example of FIG. 2B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 234 which, as shown in FIG. 2B, is directly inserted on top of the computer hardware in order to allocate hardware resources of the physical computer (physical infrastructure 236) dynamically and transparently. The hypervisor 234 affords the ability for multiple operating systems to run concurrently on a single physical computer and share hardware resources with each other.

An example of a commercially available hypervisor platform that may be used to implement portions of the cloud infrastructure 230 (210) in one or more embodiments of the invention is the VMware® vSphere™ which may have an associated virtual infrastructure management system such as the VMware® vCenter™. The underlying physical infrastructure 236 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 230 (210).

An example of a processing platform on which the cloud infrastructure 210 and/or the interactive visual data mining module 220 of FIG. 2A (as well as the components of environment 100 in FIG. 1) may be implemented is processing platform 300 shown in FIG. 3. The processing platform 300 in this embodiment comprises at least a portion of the system 200 (and/or environment 100) and includes a plurality of computing devices, denoted 302-1, 302-2, 302-3, ..., 302-P, which communicate with one another over a network 304. One or more of the elements of system 200 (100) may therefore each run on a server, computer or other processing platform element, which may be viewed as an example of what is more generally referred to herein as a "computing device" (or a processing device). As illustrated in FIG. 3, such a device generally comprises at least one processor and an associated memory, and implements one or more functional modules for controlling certain features of system 200 (100). Again, multiple elements or modules may be implemented by a single processing device in a given embodiment.

The computing device 302-1 in the processing platform 300 comprises a processor 312, a memory 314, input/output devices 316, and a network interface 318. The processor 312 may comprise a microprocessor, a microcontroller, an application-specific integrated circuit (ASIC), a field programmable gate array (FPGA) or other type of processing circuitry, as well as portions or combinations of such circuitry elements. The memory 314 may be viewed as an example of what is more generally referred to herein as a "computer program product." A computer program product comprises a processor-readable storage medium having encoded therein executable code of one or more software programs. Such a memory may comprise electronic memory such as, by way of example only, random access memory (RAM), read-only memory (ROM) or other types of memory, in any combination. The computer program code when executed by a processing device such as the computing device 302-1 causes the device to perform functions associated with one or more of the elements of system 200 (100). One skilled in the art would be readily able to implement such software given the teachings provided herein. Other examples of computer program products embodying embodiments of the invention may include, for example, optical or magnetic disks.

The computing device 302-1 also includes input/output (I/O) devices 316, for example, one or more devices or mechanisms for inputting data to the processor 312 and/or memory 314 (for example, keyboard or mouse), and one or more devices or mechanisms for providing results associated with the processor 312 and/or memory 314 (for example, display or printer).

Also included in the computing device 302-1 is network interface circuitry 318, which is used to interface the computing device with the network 304 and other system components. Such circuitry may comprise conventional transceivers of a type well known in the art.

The other computing devices 302 of the processing platform 300 are assumed to be configured in a manner similar to that shown for computing device 302-1 in the figure.

The processing platform 300 shown in FIG. 3 may comprise additional known components such as but not limited to batch processing systems, parallel processing systems, physical machines, virtual machines, virtual switches, storage volumes, logical units, etc. Again, the particular processing platform shown in the figure is presented by way of example only, and system 300 may include additional or alternative processing platforms, as well as numerous distinct processing platforms in any combination.

Also, numerous other arrangements of servers, computers, storage devices, computing devices or other components are possible in system 300. Such components can communicate with other elements of the system 300 over any type of network, such as a wide area network (WAN), a local area network (LAN), a satellite network, a telephone or cable network, or various portions or combinations of these and other types of networks.

Illustrative details of the interactive visual data mining module 220 will now be described with reference to FIGS. 4 through 6.

Illustrative embodiments described herein are based on random forest classification models. In the detailed description to follow, we first introduce the notion of a random forest, then we describe how to visualize a random forest. Finally, we propose various interactive operations on the random forest visualization.

Use Random Forest as a Classification Models

As mentioned above, a decision tree is a tree-structured model used for a classification problem. By way of example, FIG. 4 shows a training data set (table 402) comprising 10 records where each record has three attributes, namely, 'Refund,' 'Martial Status' and 'Taxable Income.' The last column in table 402 is the class label which indicates whether the taxpayer case in each row (identified by Taxpayer ID or 'Tid') is a cheat case. Assume that a decision tree 406 is generated by process 404. In a decision tree such as 406, each internal node tests an attribute, known as a splitting attribute, and each branch corresponds to an attribute value. Each leaf node assigns a classification to the record. The path from root to a leaf is a conjunction of attribute tests. Decision tree 406 summarizes the following four rules:

a) (Refund=Yes)=>(Cheat=No)
b) (Refund=No) AND (MarSt=Single) AND (TaxInc<80 k)=>(Cheat=No)
c) (Refund=No) AND (MarSt=Single) AND (TaxInc>80 k)=>(Cheat=Yes)
d) (Refund=No) AND (MarSt=Married)=>(Cheat=No)

A decision tree is a classification model in the sense that it predicts a class label for a test record: DecisionTree (record)→ClassLabel.

A predicted result is true if it is the same as the actual class. Given a test data set, the accuracy of a decision tree is the proportion of true results in the population. A decision tree, however, is a classifier with poor performance. Therefore, we call it a weak classifier or a base classifier. According to the ensemble learning theory, the performance can be significantly improved by developing an ensemble of decision trees and letting them vote for the most popular class. This ensemble (set) of decision trees is called a random forest. Assume a random forest RF including 100 decision trees, {DT1, DT2, ... DT100}, i.e., RF={DT1, DT2, ... DT100}. Then, for a given record r, the random forest classifier lets the DTs vote for the majority results, that is: RF(r)=Majority{DT1(r), DT2(r), ... DT100(r)}.

Random Forest Visualization

Reference will now be made to FIGS. 5 and 6, wherein examples of decision trees and a random forest are shown (FIG. 5), and a methodology is shown (FIG. 6) for generating and interacting with a random forest visualization, in accordance with an illustrative embodiment.

As shown in step 602 of methodology 600 (FIG. 6), a first step to visualize a random forest ensemble (set or data structure) is to generate and then visualize a decision tree. To do so, we determined what characteristic(s) of a decision tree is important to the user and how it is represented. In the embodiment of FIG. 5, we use a three-dimensional tree (i.e., a computer-generated view of an actual tree) to represent a decision tree data structure, and:

(i) use a tree fork to represent a splitting attribute;
(ii) use different leave shapes (e.g., circle, triangle, etc.) to indicate different class labels;
(iii) use trunk radius to indicate the number of records associated with the decision tree (and branch thickness to represent the number of records associated with a given branch of the decision tree); and
(iv) use the height of the trunk to indicate the classification accuracy, i.e., strength of the decision tree. The accuracy is computed from out-of-bag data or the test data set. As is known in random forest theory, when the training set for the current decision tree is drawn by sampling with replacement, about one-third of the cases are left out of the sample. This out-of-bag data is used to obtain a running unbiased estimate of the classification error as decision trees are added to the random forest. This classification accuracy/strength computation is represented in step 604 of FIG. 6.

In one illustrative embodiment, a decision tree so generated and visualized is displayed in view 502 of FIG. 5.

In order to visualize a random forest, as perhaps 100 decision trees in a plane, the following steps are performed according to FIG. 6.

For any pair of decision trees DTi and DTj in the random forest, step 606 computes their correlation Corr(DTi, DTj). The correlation is a metric for the similarity of the two trees which can be calculated from the classification results on the out-of-bag samples.

Then, step 608 computes the distance between each pair of decision trees DTi and DTj as the reciprocal of their correlation, that is Dist(DTi, DTj)=1/Corr(DTi, DTj).

Step 610 then computes the two-dimensional (coordinate) axis (x, y) for every tree given the pair-wise distances of the trees. This is basically a problem of low-dimensional space projection, and we adopt the metric multidimensional scaling (MDS) method for the problem in one embodiment.

Based on these computations, the random forest is rendered (i.e., displayed) as one or more visualizations in step 612 on a computer screen of a user.

In FIG. 5, examples of a random forest in a panoramic view 504, as well as in a close-up view 506, are shown.

The random forest is used for classifying future records. In one embodiment, we demonstrate how a random forest does the classification. Suppose the system (e.g., module 220 in FIG. 2) is given a record r. A decision tree outputs a classification result for the record, say DT(r). Each class label that the new record could be is associated with a different shading or hatching pattern. Therefore, the tree is rendered in the forest, as a result of the classification of the new record, with the corresponding shading/hatching pattern. The resulting random forest is shown in view 506 of FIG. 5. Alternatively, a unique color could be used for each class label rather than the shading/hatching patterns shown in view 506.

Interactions with Random Forest

Suppose that the system has visualized a random forest. Illustrative embodiments of the invention provide operations for the user to interact with the random forest (RF) as shown in step 614 of FIG. 6:

(i) CLASSIFICATION: The user is allowed to input a record. Every tree in the RF outputs the classification result by showing the corresponding shading/hatching pattern. The majority pattern (class label) is also reported.

(ii) CHOP-DOWN: The user can select some tree in the RF, and then chop down the tree. By CHOP-DOWN, it means that the selected tree is removed from the RF.

(iii) GROW-UP: The user can decide the number of new trees to grow up. By GROW-UP, it means that one or more new trees are added into the RF.

Once the random forest is modified due to CHOP-DOWN or GROW-UP operations, the system (module 220 in FIG. 2) evaluates the new forest promptly so that the user is aware of the effect of the operations. After CHOP-DOWN, the positions of the remaining trees remain unchanged while after GROW-UP, the positions of the newly added trees need to be computed. In a more rigorous setting, all the trees are laid out anew after any operations of CHOP-DOWN and GROW-UP.

It is realized that the classification accuracy of a random forest depends on the strength of the individual trees and the correlation between the trees. To achieve high accuracy, the strength of the trees should be high (not low) and the trees not closely correlated. Accordingly, we propose illustrative guidelines for user interaction:

(i) Some trees in a crowded area in the forest can be CHOPPED-DOWN to reduce the overall correlations.

(ii) Some small trees can be CHOPPED-DOWN due to their low strength.

(iii) Assume there are some test records. Then, the CLASSIFICATION function can be used to find weak trees. Thus, we propose to have the system input the test records in turn and examine the CLASSIFICATION results. The user can decide to CHOP-DOWN some weak trees if they misclassify records very often, or if they make some very naive misclassifications.

(iv) When the number of trees in a random forest is less than a predefined number, say 100, due to CHOP-DOWN operations, the user can decide to perform GROW-UP operations to add some trees to the random forest.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   generating at least two decision tree data structures from a high-dimensional data set;
   generating a composite data structure comprising the at least two decision tree data structures, the composite data structure being generated based on a correlation computed between the at least two decision tree data structures;

visualizing the composite data structure on a display by representing one or more attributes of the composite data structure as one or more features of a computer-generated view of a tree; and enabling modification of the composite data structure via interaction with the visualization of the composite data structure on the display.

2. The method of claim 1, wherein the composite data structure is a random forest data structure.

3. The method of claim 1, wherein the step of generating the composite data structure further comprises computing a distance between the at least two decision tree data structures.

4. The method of claim 3, wherein the distance between the at least two decision tree data structures is computed as the reciprocal of the correlation computed between the at least two decision tree data structures.

5. The method of claim 3, wherein the step of generating the composite data structure further comprises computing a coordinate axis for each of the at least two decision tree data structures based on the computed distance between the at least two decision tree data structures.

6. The method of claim 5, wherein the coordinate axis is a two-dimensional axis.

7. The method of claim 5, wherein the step of visualizing the composite data structure further comprises rendering the composite data structure on the display based on the computed coordinate axes of the at least two decision tree data structures.

8. The method of claim 1, wherein each decision tree data structure in the composite data structure is visualized such that a splitting attribute is visually represented as a tree fork.

9. The method of claim 1, wherein each decision tree data structure in the composite data structure is visualized such that different class labels are visually represented as different leave shapes.

10. The method of claim 1, wherein each decision tree data structure in the composite data structure is visualized such that the number of records associated with a given one of the at least two decision tree data structures is visually represented as a tree trunk radius.

11. The method of claim 1, further comprising computing a classification accuracy for each decision tree data structure in the composite data structure.

12. The method of claim 11, wherein each decision tree data structure in the composite data structure is visualized such that the classification accuracy is visually represented as a tree trunk height.

13. The method of claim 1, wherein the step of enabling modification of the composite data structure via interaction with the visualization of the composite data structure on the display further comprises enabling at least one of: removal of at least one decision tree data structure from the composite data structure; and addition of at least another decision tree data structure to the composite data structure.

14. The method of claim 1, further comprising classifying a new data record using the composite data structure.

15. A computer program product comprising a processor-readable storage medium having encoded therein executable code of one or more software programs, wherein the one or more software programs when executed by a processor implement the steps of:

generating at least two decision tree data structures from a high-dimensional data set;

generating a composite data structure comprising the at least two decision tree data structures, the composite data structure being generated based on a correlation computed between the at least two decision tree data structures;

visualizing the composite data structure on a display by representing one or more attributes of the composite data structure as one or more features of a computer-generated view of a tree; and enabling modification of the composite data structure via interaction with the visualization of the composite data structure on the display.

16. An apparatus comprising:

a memory; and a processor operatively coupled to the memory and configured to: generate at least two decision tree data structures from a high-dimensional data set; generate a composite data structure comprising the at least two decision tree data structures, the composite data structure being generated based on a correlation computed between the at least two decision tree data structures; visualize the composite data structure on a display by representing one or more attributes of the composite data structure as one or more features of a computer-generated view of a tree; and enable modification of the composite data structure via interaction with the visualization of the composite data structure on the display.

17. The apparatus of claim 16, wherein the composite data structure is a random forest data structure.

18. The apparatus of claim 16, wherein enabling modification of the composite data structure via interaction with the visualization of the composite data structure on the display further comprises enabling removal of at least one decision tree data structure from the composite data structure.

19. The apparatus of claim 16, wherein enabling modification of the composite data structure via interaction with the visualization of the composite data structure on the display further comprises enabling addition of at least another decision tree data structure to the composite data structure.

20. The apparatus of claim 16, wherein the processor is further configured to classify a new data record using the composite data structure.

* * * * *

UNITED STATES PATENT AND TRADEMARK OFFICE
CERTIFICATE OF CORRECTION

| | |
|---|---|
| PATENT NO. | : 8,996,583 B2 |
| APPLICATION NO. | : 13/629967 |
| DATED | : March 31, 2015 |
| INVENTOR(S) | : Chen et al. |

It is certified that error appears in the above-identified patent and that said Letters Patent is hereby corrected as shown below:

In the drawings, Fig. 5 should be replaced with the corrected Fig. 5 as shown on the attached page.

Signed and Sealed this
Twenty-second Day of March, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,996,583 B2 | |
| APPLICATION NO. | : 13/629967 | |
| DATED | : March 31, 2015 | |
| INVENTOR(S) | : Chen et al. | |

It is certified that error appears in the above-identified patent and that said Letters Patent is hereby corrected as shown below:

On the title page, under abstract "20 Claims, 5 Drawing Sheets" should read -- 20 Claims, 6 Drawing Sheets --.

In the drawings, Fig. 5 should be replaced with the corrected Fig. 5 as shown on the attached page.

This certificate supersedes the Certificate of Correction issued March 22, 2016.

Signed and Sealed this
Twenty-first Day of June, 2016

Michelle K. Lee
*Director of the United States Patent and Trademark Office*